United States Patent [19]
Kawabe et al.

[11] Patent Number: 5,360,829
[45] Date of Patent: Nov. 1, 1994

[54] FOAMED POLYESTER SHEET AND PROCESS FOR THE PRODUCTION THEREOF

[75] Inventors: Masayuki Kawabe; Masaki Yamamoto, both of Hofu, Japan

[73] Assignee: Kanebo, Ltd., Tokyo, Japan

[21] Appl. No.: 184,256

[22] Filed: Jan. 21, 1994

Related U.S. Application Data

[63] Continuation-in-part of Ser. No. 178,301, Jan. 5, 1994.

[51] Int. Cl.$^5$ .................................................. C08J 9/04
[52] U.S. Cl. ........................................ 521/81; 264/50; 521/79; 521/138; 521/180; 521/182
[58] Field of Search ................... 521/180, 182, 79, 81, 521/138; 264/50

[56] References Cited

U.S. PATENT DOCUMENTS

| | | | |
|---|---|---|---|
| 4,263,409 | 4/1981 | Liberti | 521/81 |
| 4,544,677 | 10/1985 | Allen et al. | 521/182 |
| 4,587,272 | 5/1986 | Avakian et al. | 521/182 |
| 4,616,042 | 10/1986 | Avakian | 521/81 |
| 4,683,247 | 7/1987 | Allen et al. | 521/81 |

FOREIGN PATENT DOCUMENTS 2-286725  11/1990  Japan.

*Primary Examiner*—Morton Foelak
*Attorney, Agent, or Firm*—Flynn, Thiel, Boutell & Tanis

[57] ABSTRACT

A foamed polyester sheet of this invention has uniform fine cells and a high foaming ratio. Particularly, a sheet containing a polycarbonate resin or a polyarylate resin is excellent in high-temperature stability. The foamed polyester sheet of this invention is suited for use requiring a high-temperature stability, such as a container for an electronic oven, etc.

4 Claims, No Drawings

FOAMED POLYESTER SHEET AND PROCESS FOR THE PRODUCTION THEREOF

This application is a continuation-in-part of Ser. No. 08/178,301, filed Jan. 5, 1994.

TECHNICAL FIELD

This invention relates to a foamed polyester sheet and a process for the production thereof. More specifically, this invention relates to a foamed polyester sheet formed by foaming a polyester uniform fine cells at a high foaming ratio and having an excellent stability at high temperatures, and a process for easily producing the same.

FIELD OF BACKGROUND

Thermoplastic resin foamed articles, e.g., foamed articles of polyolefins, polyurethanes polyamides have been hitherto widely used as thermal insulation materials, cushioning materials and packaging materials. Such thermoplastic resin foamed articles are generally produced by a method in which cells are incorporated, a method in which a decomposed gas of a blowing agent is utilized, a solvent evaporation method or a method in which a gas is produced by a chemical reaction.

Meanwhile, an aromatic polyester, especially polyethylene terephthalate (hereinafter referred to as "PET") has been used in fibers, films, injection-molded articles, etc. because of its excellent mechanical properties, heat resistance, chemical resistance and dimensional stability. In recent years, there have been proposed a method in which these thermoplastic polyesters are foam-molded with various blowing agents (see Japanese Laid-open Patent Application (Kokai) No. 43,871/1977), and a method in which a uniform mixture of PET and polycarbonate or inorganic carbonate is heated at a temperature of 250° to 350° C. to react, and said heating temperature is maintained until $CO_2$ is liberated, followed by foaming the reaction mixture (see Japanese Patent Publication No. 38,875/1972 and Japanese Laid-open Patent Application (Kokai) No. 41,966/1975). However, the former method involves defects such as coloration due to the blowing agent, foaming unevenness, decrease in mechanical properties. etc. The latter method possesses defects that the reaction has to be conducted at high temperatures for a long period of time and coloration of the reaction mixture and decrease in mechanical properties ace unavoidable. Further, a method for producing a foamed article by heat-melting PET containing a polyolefin and then incorporating an inert gas into the resin composition in the molten state (see Japanese Laid-open Patent Application (Kokai) No. 286,725/1990) has been also proposed. Said method using a crystalline PET, however, cannot give uniform fine cells and shows an foaming ratio of as low as less than 3.

DISCLOSURE OF THE INVENTION

It is an object of this invention to provide a foamed polyester sheet.

Another object of this invention is provide a foamed polyester sheet which has been foamed with uniform fine cells at a high foaming ratio.

Still another object of this invention is provide a foamed polyester sheet that is light in weight and excellent in mechanical performance.

A further object of this invention is to provide a foamed polyester sheet having an excellent stability at high temperatures and suitable for use a container for an electronic oven, for example.

A still further object of this invention is to provide a process that can produce the above foamed polyester sheet of this invention industrially easily.

The other objects and advantages of this invention will be clarified from the following description.

In accordance with this invention, the aforesaid objects and advantages of this invention are first achieved by a foamed polyester sheet (hereinafter referred to as a "first foamed polyester sheet") comprising a resin composition (hereinafter referred to as a "first resin composition") containing (a) 100 parts by weight of an amorphous copolyester and (b) 0.01 to 5 parts by weight of at least one foaming nucleating agent selected from the group consisting of glass, silica, talc and mica.

The amorphous copolyester (a) used in this invention is obtained by polycondensing a dicarboxylic acid component with a glycol component in a known method. It is preferable that 55 mol % or more of the dicarboxylic acid used as the acid component is occupied by one kind of an aromatic dicarboxylic acid, and it is more preferable that the dicarboxylic acid as the main component is terephthalic acid. Dicarboxylic acids other than the terephthalic acid are also available, while it is preferable that amounts of the other dicarboxylic acids are less than 45 mol % of the acid component. Examples of the other dicarboxylic acids include isophthallc acid, phthalic acid, 2,6-naphthalenedicarboxylic acid, 2,7-naphthalenedicarboxylic acid, 1,5-naphthalenedicarboxylic acid, 1,4-cyclohexanedicarboxylic acid, diphenyl-4,4'-dicarboxylic acid, 3,3'-dimethyldiphenyl-4,4'-dicarboxylic acid, and dimer acid. These other dicarboxylic acids may be used either singly or in combination.

In order to improve a heat resistance of the foamed polyester sheet, an amorphous copolyester containing 2,6-naphthalenedicarboxylic acid as the main component, e.g., an amorphous copolyester containing 50 to 90 mol %, based on the total amount of the dicarboxylic acids, of 2,6-naphthalenedicarboxylic acid, is desirable.

Examples of the dicarboxylic acid other than 2,6-naphthalenedicarboxylic acid include terephthalic acid, isophthalic acid, phthalic acid, 2,7-naphthalenedicarboxylic acid, 1,5-naphthalenedicarboxylic acid, diphenyl-4,4'-dicarboxylic acid and 3,3'-dimethyldiphenyl-4,4'-dicarboxylic acid. These dicarboxylic acids may be used either singly or in combination.

Further, it is also preferable that 55 mol % or more of the glycol component is occupied by one kind of a diol, and it is more preferable that the diol as the main component is ethylene glycol. The other diols can be also used, but it is preferable that amounts of the other diols are less than 45 mol % of the diol component. Examples of the other diols include diethylene glycol, triethylene glycol, neopentyl glycol, hexamethylene glycol, bisphenol A, bis-$\beta$-hydroxyethoxy bisphenol A, cyclohexanedimethanol, and bis-$\beta$-hydroxyethoxy bisphenol S. These other diols may be used either singly or in combination.

The amorphous copolyester used in this invention is a copolyester having crystallinity of usually 10% or less, preferably 5% or less. As a preferable example, there is given an amorphous polyester resin obtained by copolymerizing 30 to 50 mol % of a dicarboxylic acid component and/or a diol component as a third component in polycondensing terephthalic acid with ethylene glycol in a known manner, and this amorphous polyester resin is excellent in moldability, chemical resistance and color tone. Desirable examples of the third component especially used include dicarboxylic acids such as isophthalic acid, 2,6-naphthalenedicarboxylic acid, 1,4-cyclohexanedicarboxylic acid and dimer acid, and diols such as 1,4-cyclohexanedimethanol, neopentyl glycol, diethylene glycol, bis-$\beta$-hydroxyethoxy bisphenol A, bis-$\beta$-hydroxyethoxy bisphenol S, and bisphenol A.

The amorphous copolyester (a) used in this invention has a melt viscosity at a flow starting temperature of preferably at least 8,000 poise, more preferably at least 20,000 poise. When the melt viscosity is less than 8,000 poise, it is difficult to obtain a uniform cell size and a uniform cell distribution, and it happens at times that tile gas is separated and escaped from the molten resin. By the way, the flow starting temperature is a temperature which is measured when displacement of a piston starts in conducting an equal speed/elevated temperature test under a load of 500 gkf at a rate of temperature rise of 10° C./min using a device described in JIS K-7210-1976.

An intrinsic viscosity of the amorphous copolyester is preferably at least 0.6, more preferably 0.7 to 1.0. When the intrinsic viscosity is less than 0.6, it is difficult to make uniform a cell size and a cell distribution, and the gas is at times separated and escaped from the molten resin.

Examples of the foaming nucleating agent (b) used in this invention include glass, talc, silica and mica. Said agents have lower specific gravity than metals and are inexpensive because of their mass production, and those having stable qualities such as a uniform particle size, etc. are easily obtainable. These nucleating agents may be used either singly or in combination. The proportion of the foaming nucleating agent is 0.01 to 5 parts by weight per 100 parts by weight of the amorphous copolyester. When the proportion of the foaming nucleating agent (b) is less than 0.01 part by weight, the polyester cannot be foamed substantially. When it is more than 5 parts by weight, an effect as the nucleating agent becomes excessive.

The first resin composition in this invention may optionally contain a specific foaming aid (e) with which an effect of foaming can further be increased. As such foaming aid (e), preferably used is a compound selected from organic acids, Ca, Zn, Mg, Ba, Al, Pb and Mn salts of organic acids, and organic acid esters. These foaming aids may be used either singly or in combination. When the amount of the foaming aid is less than 0.01 part by weight, an effect provided by containing the foaming aid is low. When it is more than 5 parts by weight, properties of the resulting foamed article are liable to decrease.

The first foamed polyester sheet of this invention is provided as one having a density of preferably 0.01 to 1.5 g/cm$^3$, more preferably 0.03 to 1.3 g/cm$^3$.

The first foamed polyester sheet of this invention is characterized in that it is also provided as one which is foamed with uniform fine cells at a high foaming ratio (e.g., a density of 0.03 to 0.4 g/cm$^3$).

In accordance with this invention, there is further provided a foamed polyester sheet having a higher-temperature stability than the first foamed polyester sheet.

Such foamed polyester sheet further contains a polycarbonate resin or a polyarylate resin.

That is, the foamed polyester sheet (hereinafter referred to as a "second foamed polyester sheet") containing a polycarbonate resin comprises a resin composition (hereinafter referred to as a "second resin composition") containing (a) 100 parts by weight of an amorphous copolyester, (b) 0.01 to 5 parts by weight of at least one foaming nucleating agent selected from the group consisting of glass, talc, silica and mica, and (c) 20 to 100 parts by weight of a polycarbonate resin.

The foamed polyester sheet (hereinafter referred to as a "third foamed polyester sheet") containing a polyarylate resin comprises a resin composition (hereinafter referred to as a "third resin composition") containing (a) 100 parts by weight of an amorphous copolyester, (b) 0.01 to 5 parts by weight of at least one foaming nucleating agent selected from the group consisting of glass, talc, silica and mica, and (d) 15 to 100 parts by weight of a polyarylate resin.

As the amorphous copolyester (a) and the foaming nucleating agent (b) which constitute the second and third foamed polyester sheets of this invention, there may be used the same as those described in the above first foamed polyester sheet.

As the polycarbonate resin (c) constituting the second foamed polyester sheet, those obtained by a phosgene method or an ester interchange method using a bisphenol as a main starting material are desirably used. Examples of the starting bisphenol include 2,2-bis(4-hydroxyphenyl)propane (referred to as "bisphenol A") and 2,2-bis(4-hydroxyphenyl) ether (referred to as "bisphenol Z").

An average molecular weight of the polycarbonate resin (c) is preferably 1,000 to 100,000, more preferably 10,000 to 100,000. The amount of the polycarbonate resin (c) is 20 to 100 parts by weight, preferably 20 to 50 parts by weight per 100 parts by weight of the amorphous copolyester (a). When it; is less than 20 parts by weight, a sufficient high-temperature stability is not achieved. When it exceeds 100 parts by weight, flavor retention and chemical resistance which are the inherent characteristics of the polyester are impaired.

As the polyarylate resin constituting the third foamed polyester sheet, it is advisable to use a resin obtained from a bisphenol represented by the following formula,

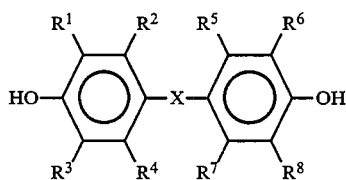

wherein X denotes —O—, —S—, —SO$_2$, —CO—, an alkylene group or a cycloalkylidene group, and R$^1$ to R$^8$ are the same or different and each denotes hydrogen atom, a halogen atom or a hydrocarbon group, and isophthalic acid and/or terephthalic acid or their derivatives.

Examples of the bisphenol include 4,4'-dihydroxydiphenyl ether, bis(4-hydroxy-2-methylphenyl) ether, bis(4-hydroxy-3-chlorophenyl) ether, bis(4-hydroxyphenyl) sulfide, bis(4-hydroxyphenyl)ketone, bis(4- hydroxyphenyl)methane, bis(4-hydroxy-3-methylphenyl)methane, bis(4-hydroxy-3,5-dichlorophenyl)methane, bis(4-hydroxy-3,5-dibromophenyl)methane, bis(4-hydroxy-3,5-difluorophenyl)methane, 1,1-bis(4-hydroxyphenyl)ethane, 2,2-bis(4-hydroxy-3-methylphenyl)propane, 2,2-bis(4-hydroxy-3-chlorophenyl)propane, 2,2-bis(4-hydroxy-3,5-dichlorophenyl)propane, 2,2-bis(4-hydroxy-3,5-dibromophenyl)propane, 1,1-bis(4-hydroxyphenyl)butane, bis(4-hydroxyphenyl)phenylmethane, bis(4-hydroxyphenyl)diphenylmethane, bis(4-hydroxyphenyl)-4'-methylphenylmethane, 1,1-bis(4-hydroxyphenyl)-2,2,2-trichloroethane, bis(4-hydroxyphenyl)-(4'-chlorophenyl)methane, 1,1-bis(4-hydroxyphenyl)cyclohexane, bis(4-hydroxyphenyl)cyclohexylmethane, and 2,2-(4-hydroxy-n-butyl)propane. The typical bisphenol used most frequently is 2,2-bis(4-hydroxyphenyl)propane that is called bisphenol A.

If required, a mixture of the bisphenol or a mixture of the bisphenol and a small amount of the other compound having two functional groups can be used, examples of the other two functional groups-containg compound being a dihydroxynaphthalene such as 2,2-dihydroxydiphenyl or 2,6-dihydroxynaphthalene, hydroquinone, resorcinol, 2,6-dihydroxychlorobenzene, 2,6-dihydroxytoluene or 3,6-dihydroxytoluene.

An intrinsic viscosity of the polyarylate resin is preferably at least 0.4, more preferably 0.6 to 1.0. When the intrinsic viscosity is less than 0.4, it is difficult to obtain a uniform cell size and a uniform cell distribution, and the gas is sometimes separated and escaped from the molten resin. When the intrinsic viscosity is less than 0.4, various physical, mechanical and chemical properties, including heat resistance, which are characteristic of the polyarylate resin, tend to deteriorate.

It is required that the amount of the polyarylate resin (d) used in this invention is 15 to 100 parts by weight, especially preferably 20 to 50 parts by weight per 100 parts by weight of the amorphous copolyester. When it is less than 15 parts by weight, a sufficient high-temperature stability can not be obtained. When it is more than 100 parts by weight, flavor retention and chemical resistance which are the inherent characteristics of the polyester are impaired.

Although the foamed polyester sheet of this invention has a sufficient mechanical strength, it can further contain, if required, 25 parts by weight or less, per 100 parts by weight of the amorphous copolyester (a), of glass fibers as a reinforcing material.

In accordance with this invention, the foamed polyester sheet of this invention can be produced by a process which comprises (1) feeding (A) a combination of 100 parts by weight of an amorphous copolyester and 0.01 to 5 parts by weight of at least one foaming nucleating agent selected from the group consisting of glass, talc. silica and mica, or (B) a combination prepared by further combining the above combination (A) with 20 to 100 parts by weight of a polycarbonate resin, or (C) a combination prepared by further combining the above combination (A) with 15 to 100 parts by weight of a polyarylate resin, into a melt extruder to conduct melt-mixing, (2) incorporating an inert gas into the resulting molten mixture while it exists in the melt extruder, and (3) extruding the mixture from a sheet-forming die to form the foamed polyester sheet.

By the above process, the first foamed polyester sheet is produced from the combination (A), the second foamed polyester sheet from the combination (B), and the third foamed polyester sheet from the combination (C), respectively.

In the step (1) of the above process. The combination (A), (B) or (C) is fed into the melt extruder to conduct melt-mixing. In the step (2), the inert gas is incorporated into the resulting molten mixture while it exists in the melt extruder. [n the step (3), the mixture is extruded from the sheet-forming die to form the foamed polyester sheet.

The process comprising the steps (1), (2) and (3) can be carried out by a plasticating extruder or a melt extruder.

The screw extruders of the above types extrude, from a metal die, the molten thermoplastic resin composition containing the cells having the inert gas uniformly dispersed therein thereby to continuously form a sheet in an intended shape. A single-screw extruder is used in most cases. However, in some cases, a twin-screw extruder or a multiple screw extruder having substantially the same function is desirable.

The thermoplastic resin composition fed into a hopper of the extruder is mixed and heated in a solid transfer zone and then sent to a melting zone. The melting zone is maintained at a temperature much higher than a melting point of the molten resin and causes melting, suction-discharging and mixing at the same time. The molten resin is carried to a melt transfer zone. In the melt transfer zone, an inert gas is forced to be incorporated into the molten resin, and stirring is conducted enough to uniformly disperse the inert gas cells throughout the molten resin. Since the resin fed from the melting zone into the melt transfer zone is designed to have a slightly low temperature, has a higher melt viscosity. This prevents the inert gas from being flowed backward through the extruder and escaped from the solid transfer zone via tile hopper. The inert gas may be any gas unless chemically reacted with the thermoplastic resin composition at a required elevated processing temperature. Said inert gas may be liquefied when filled. Typical available examples of the inert gas include a freon gas, nitrogen, carbon dioxide, propane, butane, pentane, hexane, helium, neon, argon and krypton. To save the cost, nitrogen is generally used as the inert gas.

The molten thermoplastic resin composition in the melt transfer zone is usually fed with a metering pump and finally extruded from the sheet-forming die. The metering pump and the sheet-forming die are kept at a lower temperature than a temperature of a barrel surrounding the melt transfer zone to minimize cell collapse and diffusion of the inert gas in the thermoplastic resin. When extruded from the sheet-forming die, the sheet-like extrudate is foamed to a level depending on the temperature of the melt, the length/opening ratio of the die and the shear stress in the die wall. If required, it is advisable to extrude a tube that can allow slit opening and thermoforming, using a circular die. The resulting foamed polyester sheet is cooled by air cooling, water cooling or passing through a chilled roll without stretching. The foamed polyester sheet thus produced is generally amorphous.

In the above process, it is also possible that the foaming nucleating agent and the foaming aid optionally used are not fed as such in the step (1), but are used after previously melt-mixing them with the amorphous copolyester to uniformly disperse them in said amorphous copolyester, and pelletizing the mixture.

The foamed polyester sheet can be thermoformed into a heat-set thin article with an ordinary thermoforming device. Such thermoforming method comprises 1. a step of preheating the foamed polyester sheet until it is softened, and positioning it in a mold,
2. a step of pressing the preheated sheet onto a heated mold surface,
3. a step of contacting the sheet with the heated mold for a time sufficient for partial crystallization to heat-set the formed sheet, and
4. a step of withdrawing the molded article from the cavity of the mold.

EXAMPLES

This invention will be explained by the following Examples in more detail.

An intrinsic viscosity of a polyester resin was measured in a solvent mixture of phenol/tetrachloroethane=1/1 under the conditions of 20° C. and a concentration of 1.0 g/100 cc.

A melt viscosity of the resin was measured with a nozzle diameter of 1 mm and under a load of 100 kg/cm$^2$ using a flow tester (model: CFT-500) manufactured by Shimadzu Corporation.

A heat deflection starting temperature was measured with a compression mode of a thermal mechanical analyzer (TAS-100) manufactured by Rigaku K.K. In this invention, a foamed sheet having a heat deflection starting temperature of 100° C. or higher is suitable because of excellent heat resistance.

Example 1

One hundred parts by weight of a polyethylene terephthalate resin (an intrinsic viscosity=0.7, a melt viscosity at a flow starting temperature of 150° C. =25,000 poise) containing 30 mol % of 1,4-cyclohexanedimethanol as the copolymerized unit were dry blended with 0.6 part by weight of talc and 0.4 part by weight of zinc stearate. The dry blended composition was extruded by an extruder having a screw with a diameter of 65 mm and L/D of 30. By rotating tile extruder at 100 rpm and maintaining a temperature of a melting zone at 210° C. and a temperature of a die at 190° C., a nitrogen gas was fed from a bent portion of the melting zone under pressure of 40 kg/cm$^2$. On this occasion, a melt viscosity of the resin in the melting zone was 8,300 poise. The resulting foamed sheet had a density of 0.35 g/cm$^3$ (a foaming ratio=3.7), a thickness (measured with a micrometer) of 0.5 mm, a cell size of 60 to 150 μm, and a heat deflection starting temperature of 80° C.

Example 2

A foamed sheet was produced in the same manner as in Example 1 except that the temperature of the melting zone was held at 190° C. and the temperature of the die at 160° C. On this occasion, a melt viscosity of the resin in the melting zone was 25,000 poise. The resulting foamed sheet had a density of 0.25 g/cm$^3$ (a foaming ratio=5.2), a thickness of 0.5 mm and a cell size of 60 to 150 μm.

Example 3

One hundred parts by weight of a polyethylene terephthalate resin (an intrinsic viscosity=0.7, a flow starting temperature of 150° C.) containing 40 of isophthalic acid as the copolymerized unit were dry blended with 0.6 part by weight of talc and 0.4 part by weight of zinc stearate. The dry blended composition was extruded by an extruder having a screw with a diameter of 65 mm and L/D of 30. By rotating the extruder at 100 rpm and maintaining a temperature of a melting zone at 180° C. and a temperature of a die 160° C., a nitrogen gas was fed from a bent portion of the melting zone under pressure of 40 kg/cm$^2$. On this occasion, a melt viscosity of the resin in the melting zone was 14,000 poise. The resulting foamed sheet had a density of 0.40 g/cm$^3$ (a foaming ratio=3.3), a thickness of 0.5 mm and a cell size of 60 to 200 μm.

Comparative Example 1

One hundred parts by weight of a polyethylene terephthalate resin (an intrinsic viscosity=0.7, a melt viscosity at a flow starting temperature of 235° C. =2,000 poise) were dry blended with 3 parts by weight of low-density polyethylene. The dry blended composition was extruded by an extruder having a screw with a diameter of 65 nun and L/D of 30. By rotating the extruder at 100 rpm and maintaining a temperature of a melting zone at 280° C. and a temperature of a die at 260° C., a nitrogen gas was fed from a bent portion of the melting zone under pressure o Qif 40 kg/cm$^2$. On this occasion, a melt viscosity of the resin in the melting zone was 2,900 poise. The resulting foamed sheet had a density of 0.85/cm$^3$ (a foaming ratio=1.6), a thickness of 0.5 mm and a cell size of 10 to 300 μm.

Example 4

One hundred parts of a polyethylene terephthalate resin (an intrinsic viscosity =0.7) containing 30 mol % of 1,4-cyclohexanedimethanol as the copolymerized unit were dry blended with 100 parts by weight of a polycarbonate resin having an average molecular weight of 20,000, 0.6 part by weight of talc and 0.4 part by weight of zinc stearate. The dry blended composition was extruded by an extruder having a screw with a diameter of 65 mm and L/D of 30. By rotating the extruder at 100 rpm and maintaining a temperature of a melting zone at 210° C. and a temperature of a die at 190° C., a nitrogen gas was fed from a bent portion of the melting zone under pressure of 40 kg/cm$^2$. On this occasion, a melt viscosity of the resin in tile melting zone was 9,300 poise. The resulting foamed polyester sheet had a thickness of 0.5 mm, a cell size of 60 to 150 μm, a density of 0.35 g/cm$^3$, a foaming ratio of 3.7 and a heat deflection starting temperature of 140° C.

Example 5

A foamed polyester sheet was produced in the same manner as in Example 4 except that the amount of the polycarbonate resin was changed into 50 parts by weight. On this occasion, a melt viscosity of the resin in the melting zone was 10,000 poise. The resulting foamed sheet had a thickness of 0.5 mm, a cell size of 60 to 150 μm, a density of 0.40 g/cm$^3$, a foaming ratio of 4.2 and a heat deflection starting temperature of 120° C.

Example 6

One hundred parts by weight of a polyethylene terephthalate resin (an intrinsic viscosity=0.7) containing 30 mol % of 1,4-cyclohexanedimethanol as the copolymerized unit were dry blended with 100 parts by weight of a polyarylate resin obtained from 2,2-bis(4-hydroxyphenyl)propane, isophthalic acid and terephthalic acid (50 mol % each), 0.6 part by weight of talc and 0.4 part by weight of zinc stearate. The dry blended composition was extruded by an extruder having a screw with a diameter of 65 mm and L/D of 30. By rotating the extruder at 100 rpm and maintaining a temperature of a melting zone at 210° C. and a temperature of a die at 190° C., a nitrogen gas was fed under pressure from a bent portion of the melting zone under pressure of 40 kg/cm². On this occasion, a melt viscosity of the resin in the melting zone was 9,300 poise. The resulting foamed sheet had a thickness of 0.5 mm, a cell size of 60 to 150 μm, a density of 0.35 g/cm³, a foaming ratio of 3.7 and a heat deflection starting temperature of 190° C.

Example 7

A foamed sheet was produced as in Example 6 except that the amount of the polyarylate resin was changed into 50 parts by weight. On this occasion, a melt viscosity of the resin in the melting zone was 10,000 poise. The resulting foamed sheet had a thickness of 0.5 mm, a cell size of 60 to 150 μm, a density of 0.40 g/cm³, a foaming ratio of 4.2 and a heat deflection starting temperature of 120° C.

Example 8

One hundred parts of a polyethylene naphthalate resin (an intrinsic viscosity=0.6, a melt viscosity at a flow starting temperature of 150° C.=20,000 poise) containing 10 mol % of terephthalic acid and 90 mol % of 2,6-naphthalenedicarboxylic acid as acid components were dry blended with 0.6 part by weight of talc and 0.4 part by weight of zinc stearate. The dry blended composition was extruded by an extruder having a screw with a diameter of 65 mm and L/D of 30. By rotating the extruder at 50 rpm and maintaining a temperature of a melting zone at 280° C. and a temperature of a die at 270° C., a nitrogen gas was fed from a bent portion of the melting zone under pressure of 80 kg/cm². On this occasion, a melt viscosity of the resin in the melting zone was 12,000 poise. The resulting foamed sheet had a thickness of 2.0 mm, a cell size of 40 to 50 μm, a density of 0.20 g/cm³, a foaming ratio of 6.65 and a heat deflection starting temperature of 127.2° C.

Example 9

A foamed sheet was produced in the same manner as in Example 8 except that 100 parts by weight of the polyethylene naphthalate resin was changed to 100 parts by weight of a polyethylene naphthalate resin (an intrinsic viscosity=0.7, a melt viscosity at a flow starting temperature of 150° C.=25,000 poise) containing 50 mol % of terephthalic acid and 50 mol % of 2,6-naphthalenedicarboxylic acid as acid components. On this occasion, a melt viscosity of the resin in the melting zone was 15,000 poise. The resulting foamed sheet had a thickness of 2.0 mm, a cell size of 30 to 50 μm, a density of 0.18 g/cm³, a foaming ratio of 7.39 and a heat deflection starting temperature of 105.2° C.

We claim:

1. A process for producing a foamed polyester sheet, which comprises
    (1) feeding
        (A) a combination of 100 parts by weight of an amorphous copolyester and 0.01 to 5 parts by weight of at least one foaming nucleating agent selected from the group consisting of glass, talc, silica and mica, or
        (B) a combination prepared by further combining the above combination (A) and 20 to 100 parts by weight of a polycarbonate resin, or
        (C) a combination prepared by further combining the above combination (A) and 15 to 1.00 parts by weight of a polyarylate resin as derived from a bisphenol compound, into a melt extruder to conduct melt-mixing,
    (2) incorporating an inert gas into the resulting molten mixture while it exists in the melt extruder, and
    (3) extruding the mixture from a sheet-forming die to form the foamed polyester sheet;.

2. The process of claim 1 wherein the amorphous copolyester (a) is a copolymer comprising terephthalic acid and ethylene glycol as the main components.

3. The process of claim 1 wherein the amorphous copolyester used in the step (1) has a melt viscosity at a flow starting temperature of at least 8,000 poise.

4. The process of claim 1 wherein a foaming aid selected from the group consisting of organic acids, organic acid esters, and Ca, Zn, Mg, Ba, Al, Pb and Mn salts of organic acids is further fed in the step (1).

* * * * *

UNITED STATES PATENT AND TRADEMARK OFFICE
CERTIFICATE OF CORRECTION

PATENT NO. : 5,360,829
DATED : November 1, 1994
INVENTOR(S) : Masayuki KAWABE, et al.

It is certified that error appears in the above-indentified patent and that said Letters Patent is hereby corrected as shown below:

Title page, please add:

---[30] Foreign Application Priority Data
July 12, 1991    Japan    198 504/91
July 30, 1991    Japan    214 291/91
March 31, 1992   Japan    108 626/92---.

Column 10, line 29; change "1.00" to ---100---.
         line 30; delete "as".
         line 36; delete ";".

Signed and Sealed this

Twenty-eight Day of March, 1995

Attest:

BRUCE LEHMAN

Attesting Officer        Commissioner of Patents and Trademarks